Jan. 23, 1934.  C. ZIEGLER  1,944,625
APPARATUS FOR TEMPERING GLASS SHEETS
Filed Aug. 12, 1930
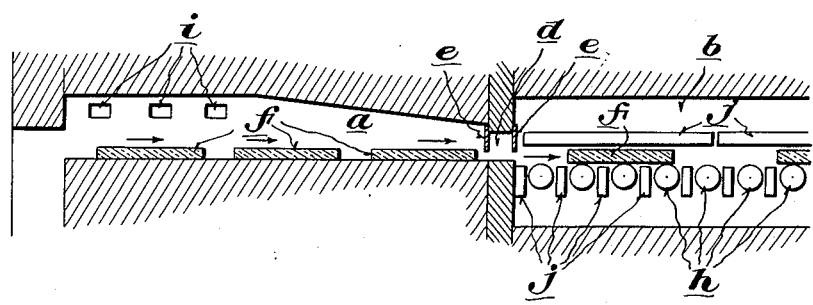
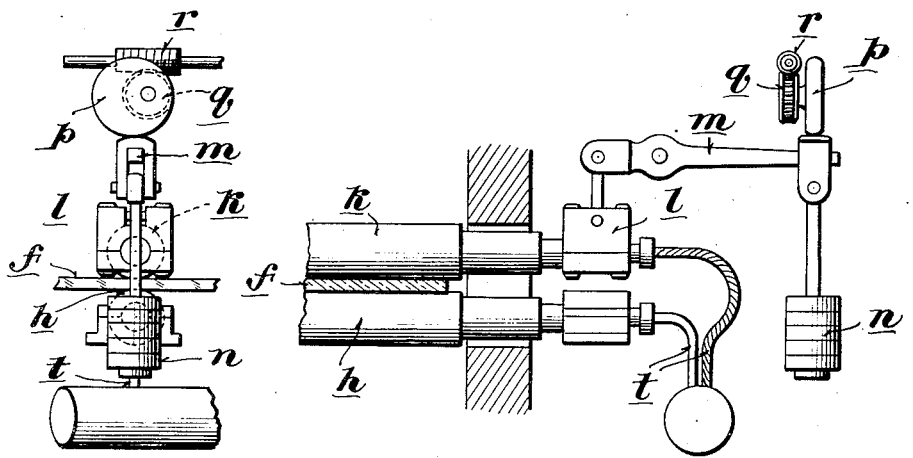
Inventor
Charles Ziegler,
By Dorey Cole.
Attorneys Patented Jan. 23, 1934

1,944,625

UNITED STATES PATENT OFFICE 1,944,625

APPARATUS FOR TEMPERING GLASS SHEETS

Charles Ziegler, Paris, France, assignor, by mesne assignments, to The American Securit Company, a corporation of Delaware Application August 12, 1930, Serial No. 474,683, and in France September 21, 1929

1 Claim. (Cl. 49—47)

This invention has for its object to provide means whereby sheets and slabs of glass may be tempered by suddenly cooling them from a high temperature for the purpose of increasing the strength of the sheets. For this purpose it provides mechanism whereby the sheet may be highly heated and may be passed directly from a highly heated zone into a cooling zone, or to a zone where it is subjected to cooling influences, in order to obtain the desired tempering of the sheet as will be hereinafter more fully described and claimed.

Referring to the accompanying drawing in which corresponding parts are designated by corresponding marks of reference,—

Fig. 1 is a longitudinal section through a device embodying my invention.

Fig. 2 and Fig. 3 are details of the construction of cooling rollers and of the mounting thereof suitable for use in connection with the mechanism shown in Fig. 1.

The structure shown in Fig. 1 is adapted for the automatic quantity production of tempered sheets in accordance with this invention.

In the drawing $a$ is a heated chamber, maintained at a suitably high temperature by any appropriate means such as the flues $i$ and through which sheets $f$ may be passed in any suitable means to be eventually fed through the throat $d$ located in the wall $c$ at the exit end of the chamber, and covered with asbestos curtains $e$. The sheet on passing out of the throat moves directly into a tempering chamber $b$, where it is received on carrying rollers $h$, by which it is carried between cooling elements $j$—$j$, arranged above and/or below it. These elements are preferably in the form of hollow blocks or tubes cooled by circulating cooling fluid therethrough with their surfaces adjacent to the surface of the moving sheet, whereby the sheet will be cooled by radiation. The carrying rollers may also be cooled by circulating cooling water therethrough, and when this is done the sheet is cooled to a certain extent by direct contact with cooling elements.

If desired, the rollers $k$ (see Figs. 2 and 3) may be arranged also above the sheet and arranged to make rolling contact therewith for the purpose of cooling the upper surface thereof. Care must be taken in this case not to fracture the sheet when chilled by excess pressure. This may be prevented by the arrangement shown in Figs. 2 and 3 in which the upper roller $k$ is carried in floating bearings $l$. Each of these bearings is supported from one end of a lever $m$, the opposite end of which carries a counterweight $n$ to relieve the weight of the roller on the sheet. The lowest position of the upper rollers may be accurately determined by an eccentric $p$ located above the counterweighted end of the lever $m$ and adjusted by the worm shaft $r$ and worm wheel $q$.

As shown, the rollers may have cooling water introduced into them by the pipes $t$. The rollers may be driven by any suitable mechanism.

Having thus described my invention what I claim as new and desire to secure by United States Letters Patent is:—

In an apparatus for tempering glass sheets, the combination with a heating chamber through which the sheet is fed, of a cooling chamber located at the exit end of the heating chamber, conveying rollers located within the cooling chamber, and chilling surfaces adjacent to the path of the glass on the rollers.

CHARLES ZIEGLER.